Figure 1:
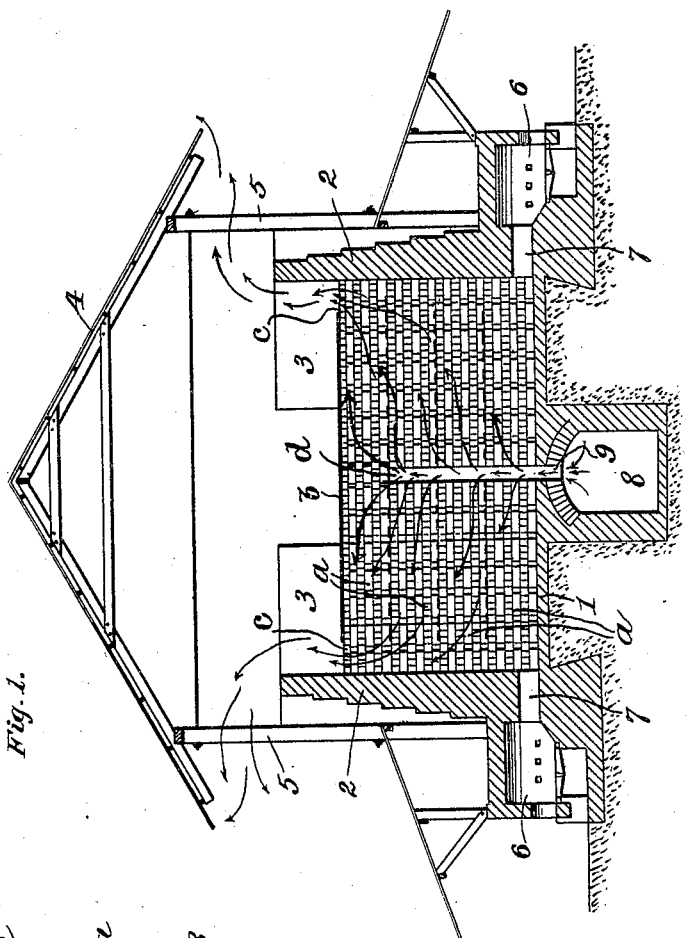

No. 816,386. PATENTED MAR. 27, 1906.
A. A. SCOTT.
METHOD OF TREATING PLASTIC MATERIAL.
APPLICATION FILED NOV. 13, 1905.

4 SHEETS—SHEET 1.

Witnesses.
William Whaley
Carrie R. Ivy

Inventor
Alexander A. Scott
per
Cyrus Kehr,
Attorney.

No. 816,386. PATENTED MAR. 27, 1906.
A. A. SCOTT.
METHOD OF TREATING PLASTIC MATERIAL.
APPLICATION FILED NOV. 13, 1905.
4 SHEETS—SHEET 2.
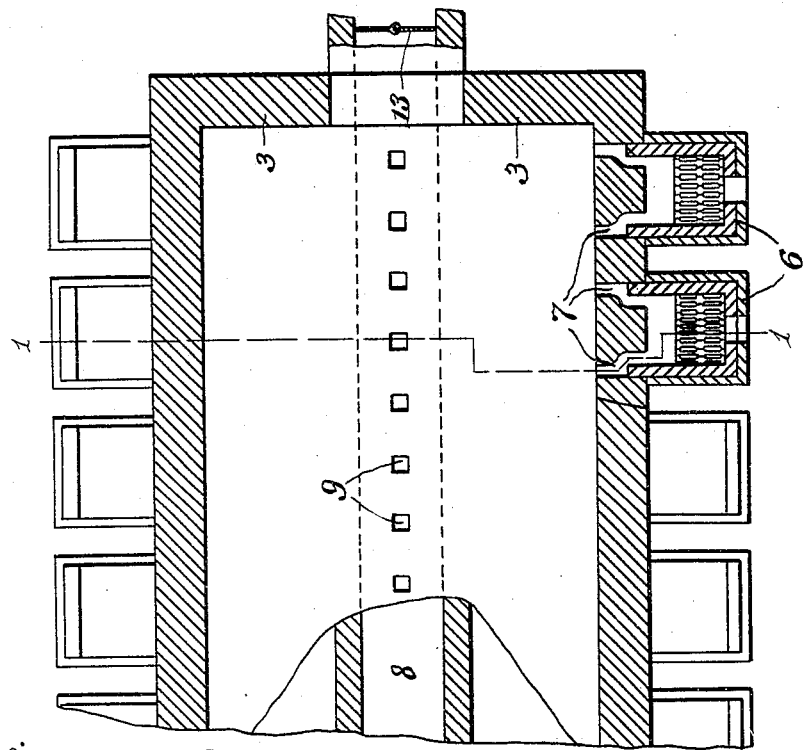
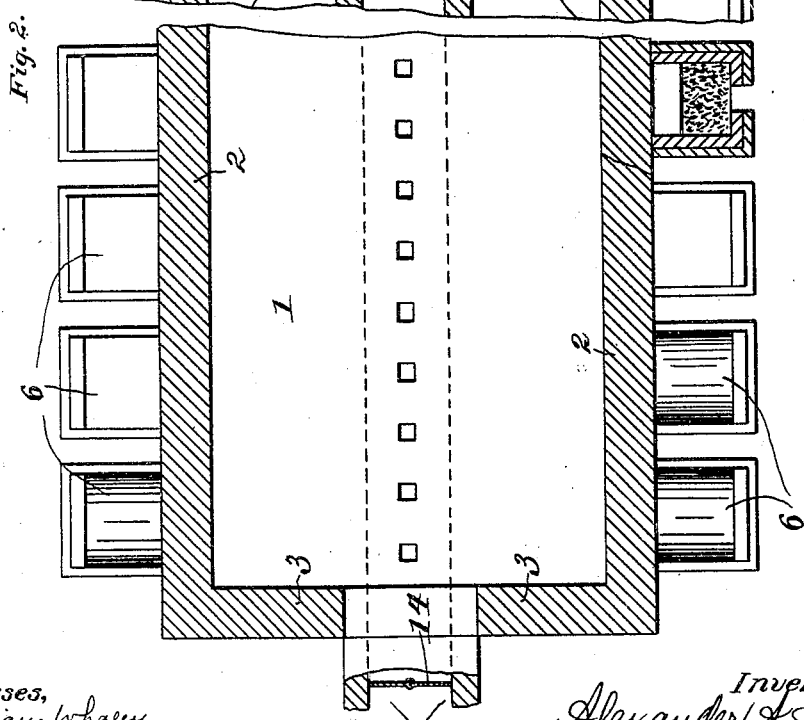
Fig. 2.
Witnesses,
William Whaley
Carrie R. Ivy
Inventor.
Alexander A. Scott
per
Cyrus Kehr
Attorney.

No. 816,386. PATENTED MAR. 27, 1906.
A. A. SCOTT.
METHOD OF TREATING PLASTIC MATERIAL.
APPLICATION FILED NOV. 13, 1905.
4 SHEETS—SHEET 3.
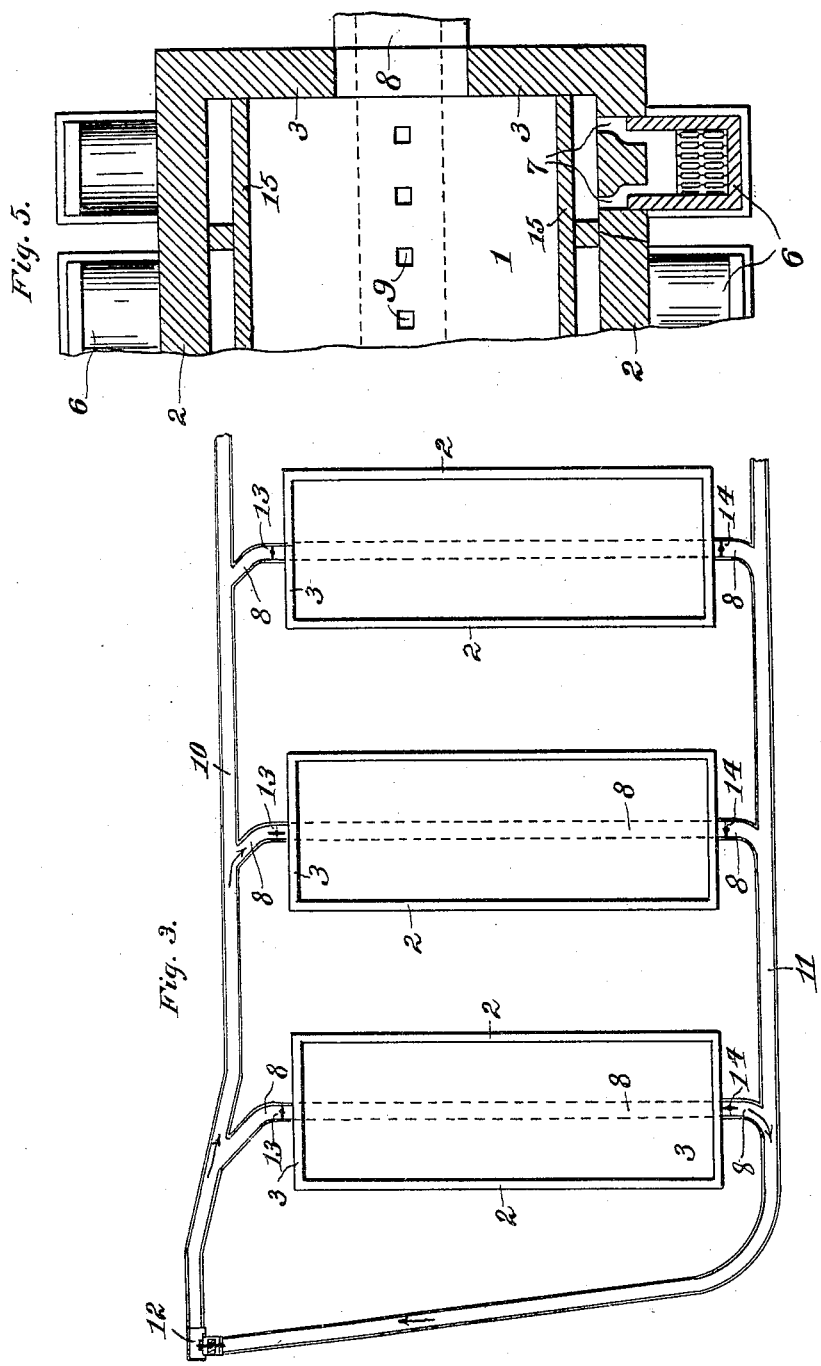
Witnesses,
William Whaley
Carrie R. Ivy
Inventor,
Alexander A. Scott
per
Cyrus Kehr,
Attorney.

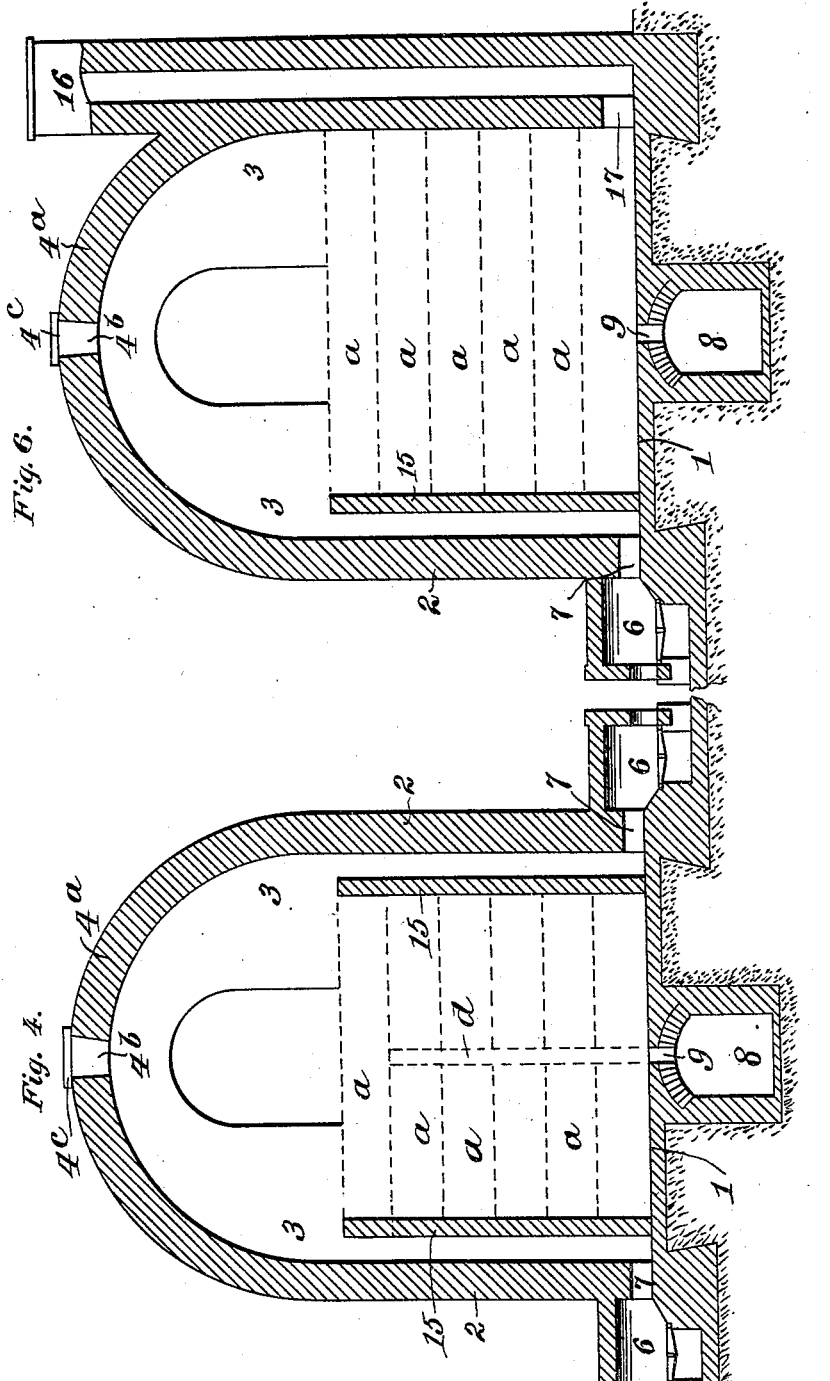

UNITED STATES PATENT OFFICE.

ALEXANDER ANDERSON SCOTT, OF KNOXVILLE, TENNESSEE.

METHOD OF TREATING PLASTIC MATERIAL.

No. 816,386.          Specification of Letters Patent.          Patented March 27, 1906.

Application filed November 13, 1905. Serial No. 287,086.

*To all whom it may concern:*

Be it known that I, ALEXANDER ANDERSON SCOTT, a citizen of the United States, residing at Knoxville, in the county of Knox and State of Tennessee, have invented a new and useful Improvement in Methods of Treating Plastic Material, of which the following is a specification, reference being had to the accompanying drawings.

My improvement relates generally to methods of treating clay and analogous plastic material for the manufacture of brick, tile, and analogous artificial products requiring drying under relatively moderate temperature and subsequent "burning" by being subjected to an intense heat; and the improvement relates particularly to the manufacture of such products from what is termed "stiff" clay in the clay-working art, the term "soft" clay being applied to those clays which are so plastic when formed into green bricks that such bricks must be set in single courses for drying, (the plasticity being such that each individual brick would be pressed out of form by the weight of another brick placed upon it,) and the term "dry" being applied to clays from which bricks may be formed sufficiently firm to permit piling or setting in a kiln as high as is ordinarily desired for burning. Approximately seventy-five per cent. of the brick manufactured in this country are made from stiff clays. Throughout this specification the description relates, primarily, to the manufacture of clay products from such stiff clays, and, secondarily, to the manufacture of clay products from such soft clays.

Blocks of clay for the manufacture of brick and analogous products are formed from clay which has been rendered plastic and cohesive by mixing it with enough water to make it moist or wet, and such blocks are said to be "wet" or "green." Before these blocks so formed can be burned the water which they contain must be eliminated from them. Heretofore in the manufacture of stiff-clay brick this has usually been done in two steps, the first of said steps being the slow drying at a relatively low temperature, from approximately 100° to 600° Fahrenheit, while the brick are set upon each other in from about five to ten tiers or courses (it being necessary to limit the number of courses because the blocks are plastic and are not able to withstand any considerable pressure without changing shape account of said pressure) until the plasticity of the bricks is sufficiently reduced to adapt them to resist the downward pressure incident to setting for burning, and the second step being the placing of the bricks into a kiln and after being set as high as is desired for burning subjecting them to a higher drying heat ranging from 500° to 1,000° Fahrenheit until the remnant of water not eliminated by the first step of drying has been eliminated. This second step of drying is by some manufacturers called "water-smoking." In a general way it may be stated that the green brick are subject to currents of air or other gaseous medium which is capable of taking up moisture from said blocks and carrying said moisture away, whereby the amount of moisture contained by said blocks is gradually more and more reduced. For the sake of convenience in description said air or other gaseous medium may be termed "drying-air" or a "drying gaseous medium." Such capability to absorb and carry away moisture varies to a large extent with the temperature of the gaseous medium, and the rapidity with which said moisture is eliminated from said blocks must vary according to variations in the quality of the clay. For some clays the absorption during the first stages of the drying must be slow in order to avoid checking said blocks. In some instances it is desirable to begin with currents of air which are of low temperature (so that they will absorb slowly) or which are nearly saturated with moisture, so that they can take but little more moisture than they already hold. Some manufacturers perform this first step of drying by exposing the bricks in low piles to the sunlight and to natural currents of air at normal temperature; but according to the prevailing practice said bricks are laid or set on trucks in a limited number of courses and on said trucks put into an inclosure or structure termed a "drier" and there subjected to currents of air at a relatively low temperature—from approximately 100° to 600° Fahrenheit—until the plasticity of the bricks has been sufficiently reduced to permit setting to the height desired for burning—from about thirty to fifty courses high. Such method is undesirable, because it necessitates expenditure for the construction and maintenance of the driers and requires extra handling of the bricks, and the method is not adapted to the mechanical handling of the brick direct from the machine to the kiln and because there is loss of heat in transferring the brick from the drier into the kiln.

The objects of my invention is to reduce the cost of mechanical equipment, to reduce the handling of the brick, to allow such handling to be to the largest extent mechanical direct from the machine into the kiln, and to avoid such loss of heat in the passing of the brick from the drier into the kiln.

By my improved method the drier is altogether dispensed with and the bricks are set in the kiln direct from the machine in the green or wet state and are not again moved until they have been both dried and burned.

By way of general description it may be stated that my improved method involves setting the green or wet blocks in the kiln in a group, belt, or zone to only such height as will avoid crushing the lower of said blocks, then drying said blocks, and thereby rendering them sufficiently firm to support greater pressure from above, then setting upon the group, belt, or zone of blocks thus dried another group, belt, or zone of green blocks, then drying the blocks of said second group, belt, or zone, then setting a third group, belt, or zone of green or wet blocks upon said second group, then drying said third group, and so on until the total height of all said groups aggregates the height desired for the burning of said blocks.

For the sake of economy the practice of my method may, if so desired, also include the utilization of the heated air (termed "waste heat" in this art) coming from a charged kiln during the cooling period after the charge has been burned and the products of combustion coming from a charged kiln during the burning period, said heated air or said products of combustion being drawn through suitable ducts into a kiln or compartment of a kiln in which a group of green brick has been set ready for drying. As to economy, it may be noted that by my improved method the saving of labor after the stream of plastic material leaves the machine is fully fifty per cent. Besides this item, there is a saving of heat. Furthermore, the cost of mechanical equipment is reduced approximately one-half.

The present invention is a modification of the method described in an application for Letters Patent of the United States filed by me October 12, A. D. 1905, Serial No. 282,414.

My improved method may be practiced or carried out by various mechanical means. As examples of such means I refer to the apparatus illustrated by the accompanying drawings.

Figure 7:
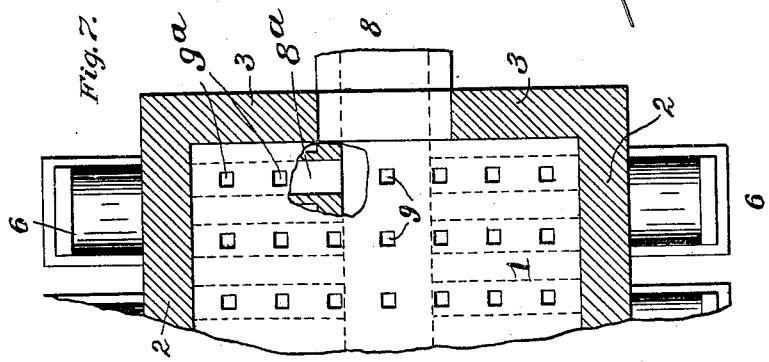

In said drawings, Figure 1 is a transverse upright section of an open-top kiln adapted for the practice of said method, said section being on the line 1 1 of Fig. 2. Fig. 2 is a sectional plan of the same kiln. Fig. 3 is a diagrammatic plan showing a group of three kilns and underground ducts communicating with said kilns. Fig. 4 is a transverse upright section of a closed kiln adapted to the practice of said method, said section being on the line 4 4 of Fig. 5. Fig. 5 is a sectional plan of the kiln shown in Fig. 4. Fig. 6 is an upright cross-section of a kiln similar to that shown in Fig 4, but having furnaces at only one side and having smoke-stacks or chimneys. Fig. 7 is a detail plan of a modification.

Referring first to Figs. 1 and 2, 1 is the floor of the kiln. 2 2 are the side walls. 3 3 are the end walls, and 4 is a roof supported by posts 5 5, at some distance above said side and end walls, so that the products of combustion resulting from the burning of the brick in the kiln will pass over said side and end walls and laterally beneath said roof into the atmosphere. Along the base of each side wall 2 is a series of ovens 6, communicating with the kiln-chamber through flues 7, opening into said chamber at or near the floor 1. Approximately midway between and parallel to the side walls 2 2 a duct 8 extends horizontally through the ground beneath the floor 1, and from said duct ports or passages 9 extend upward through the floor 1 into the kiln-chamber. In Fig. 3 three such kilns are shown in diagram, and each duct 8 communicates at one end of its kiln with a duct 10 and at its other end with a duct 11, the duct 10 leading from a fan 12, while the duct 11 leads to said fan. The number of said kilns may and for economy in operation should be more than three. Between each such kiln and the duct 10 the ducts 8 are provided with gates or dampers 13, and between said kilns and the duct 11 said ducts 8 are provided with similar gates or dampers 14. It will be observed that this arrangement of said flues and said fan provides mechanical means for driving gases through the ducts 8 and ports or passages 9 into any one of said kiln-chambers or drawing gases from said kiln-chamber downward through said ports or passages into the duct 8, the gate 13 being left open and the gate 14 being closed for the former operation and the positions of said gates being reversed for the latter operation, the fan being set and operated to take gases from the duct 11 and discharge them into the duct 10.

The operation is as follows: The furnaces 6 being closed, horizontal tiers of brick a are set upon the floor 1, just as brick from the drier are ordinarily set in such a kiln preparatory to burning, the brick being extended to or against each side wall 2; but the number of layers is limited, according to the plasticity of said brick. In other words, said brick are set only as high as they would be in a drier—from about five to ten high—if they are of stiff clay, in order that the bricks in the lower layers may not be pressed out of shape by the weight of the superposed layers. Now the wickets are closed as high as the top of said group, and a cover $b$ is placed upon the brick thus piled, said cover extending across said group of brick centrally and the lateral edges not reaching to the side walls 2 2, so that said brick are isolated in a compartment in the lower portion of the kiln-chamber. Said cover may be paper or sheet metal, or any other suitable sheet-form material capable of withstanding the relatively low heat under which the brick are to be dried. The said group of bricks being thus isolated, a gaseous drying medium is now driven through the duct 8 and from the latter through the ports or passages 9 into the central lower portion of said group, and thence upward and laterally toward each lateral wall 2 and upward through the space $c$ between said cover and said lateral walls, and thence through the upper portion of the kiln-chamber into the atmosphere, said cover, as is obvious from an inspection of the drawings, serving to deflect the rising gaseous medium horizontally. This operation is continued until said group of bricks has been sufficiently dried for the setting of additional superposed groups. Then said cover $b$ is removed and another group is set upon the first group and a cover $b$ placed upon said second group $a$ and a drying gaseous medium again driven through the duct 8 and from the latter through the ports or passages 9 into the base of the mass of brick and upward through the latter until said stream of gaseous medium is deflected horizontally by said cover toward each lateral wall 2 until the opening between the lateral edges of said cover and said walls is reached, where said gaseous medium escapes into the upper portion of the kiln-chamber and thence into the atmosphere. This operation is repeated until the kiln has been charged as high as desired. It will be observed that inasmuch as said drying gaseous medium is driven upward through the passages 9 its tendency is to rise, and such movement is only terminated by the deflecting action of the horizontal cover $b$, and such tendency to rise is all the more pronounced if the drying gaseous medium is hot, as is usually its condition. If it be desired to facilitate the upward movement of said gaseous medium, the brick in all of the groups excepting the uppermost may be set with flue-spacing $d$ (continuous or interrupted) above the ports or passages 9. Obviously such flue-spacing may, if so desired, be extended also into the uppermost group $a$; but its omission has been above suggested because such extension is deemed unnecessary. When the mass of brick has in this manner been set to the height desired and thus dried group by group, the entire mass of said brick may be further dried by driving a drying gaseous medium of the same or higher temperature through the duct 8 and from the latter through the ports or passages 9 into and through the entire mass of said brick, the cover $b$ being left upon the uppermost group, if so desired, or such additional drying may be accomplished by closing the duct 8 and opening the furnaces 6 and allowing the products of combustion from moderate fires in said furnaces to pass through the flues 7 and thence through the entire mass of brick. When the entire mass of brick is sufficiently dried for burning, (either by the exposure of each separate group to the action of the drying agent or by such separate exposure and the subsequent exposure of the entire mass to the drying agent,) the entire mass of brick is subjected to the intense heat of products of combustion coming from strong fires maintained in said furnaces, this burning step being by itself the same as is now ordinarily practiced in open-top kilns. To facilitate or regulate the movement of the products of combustion from the furnaces 6 through the flues 7 into the mass of brick, the lower courses of the brick may be set with suitable horizontal spacing, as is now the practice in operating kilns of this type. After the entire charge or mass of brick has been burned the air heated during the period of cooling of said brick may be utilized in drying the brick in one or more adjoining kilns. In this art such heated air is called "waste heat." Such utilization may be effected by means of the apparatus illustrated in Fig. 3. If the right-hand kiln in said figure has been charged and the burning of said charge completed and one of the other kilns in said figure is being charged, then the gate 13 of said right-hand kiln is closed and the gate 14 of the same kiln opened, while the gate 13 of the next kiln is opened and the gate 14 of the same kiln is closed. Then the operation of the fan 12 will exhaust the air from the duct 8 of the first kiln through the duct 11 and drive said air through the duct 10 into the duct 8 of the next kiln and through said duct 8 into said next kiln. For the sake of economy the operation of charging and drying should be carried on simultaneously in two kilns, a group of brick being set in one, while a fresh group is being subjected to the action of a drying agent in the other of said two kilns. When this is done, the hot air or waste heat drawn from the cooling-kiln, as above described, may be driven alternately into said two kilns, so that said waste heat is uninterruptedly utilized. In the average of these operations the waste heat is sufficient for drying all the brick, and if such waste heat be uninterruptedly and constantly used in the manner above indicated the direct application of products of combustion from the furnaces for any portion of the drying operation is unnecessary.

As to its main or generic features, said method may also be practiced by means of the kiln illustrated by Fig. 4 and 5. In its main features said kiln is a duplication of the open-top kiln shown by Figs. 1 and 2. In said Figs. 4 and 5 the floor 1, side walls 2, end walls 3, furnaces 6, flues 7, underground duct 8, and ports or passages 9 are present, as in Figs. 1 and 2; but in lieu of the roof 4 of Figs. 1 and 2 there is an arch 4$^a$, supported by the lateral walls 2, and in said arch are crown-ports 4$^b$, provided with covers 4$^c$, and adjacent to and parallel with the inner face of each lateral wall 2 is a bag-wall 15, rising from the floor 1 to any desired height, preferably high enough to adapt said kiln for burning by a downdraft. The brick are set in groups in this kiln just as they are in the kiln shown by Figs 1 and 2, the brick extending laterally to or against each bag-wall, (said bag-wall being, in effect, the lateral wall of the kiln compartment or chamber,) and the drying operation is carried on group by group in the same manner, the furnaces being closed and the crown-ports 4$^b$ being open for the escape of the drying agent after escaping from the uppermost group of brick, and the drying operation may be extended after the last group has been set by continuing the driving of the gaseous medium through the duct 8 and the ports or passages 9 or by driving the products of combustion from a moderate fire in said furnaces upward through the space between the lateral walls 2 and the bag-walls 15 into the upper portion of the kiln-chamber and thence downward through the mass of brick, the movement of said products of combustion through the course indicated being stimulated or forced by exhausting the air and said products of combustion from the duct 8. When the entire mass of said brick is ready for burning, the burning operation is carried on by building intense fires in said furnaces and exhausting the air and products of combustion from the duct 8, whereby the products of combustion from said furnaces pass through the flues 7, the spaces between the lateral walls 2, and the bag-walls 15 into the upper portion of the furnace-chamber and thence downward through the mass of brick, the ports or passages 9, and the duct 8. Fig. 3 is a diagrammatic representation of this form of kiln, as well as of the open-top form of kiln, and when the ducts 10, 11, and 8 and the fan 12 and gates 13 and 14 are arranged as shown in said figure, in connection with the closed form of kiln, the products of combustion entering the duct 8 during the burning period may be drawn into the duct 11 and through the fan 12 and thence through the duct 10 into another duct 8 and from the latter into the kiln-chamber, under which said duct extends, and thence passed through green brick set in said kiln for drying in the manner already described in connection with the open-top kiln. Thus it will be seen that in connection with the closed form of kiln products of combustion escaping from the mass of brick being burned, as well as the heated air escaping from the mass of cooling brick, may be utilized in another kiln or kilns for the drying of green brick.

The construction shown by Fig. 6 differs from that shown by Figs. 4 and 5 only in that the furnaces 6 and the bag-wall at the right-hand side are omitted and stacks or chimneys 16 are placed along said side of the kiln and made to communicate with the kiln-chamber through a port 17, placed at or near the base of each stack. In this kiln the drying operation is carried on as described in connection with Figs. 4 and 5, while during the burning operation the products of combustion may be exhausted through the duct 8 or through the stacks 16, as may be desired.

In Fig. 7 the duct 8 is provided with horizontal branches 8$^a$, from which ports or passages 9$^a$ extend upward through the floor 1. When the kiln is thus constructed, the drying gaseous medium driven into the duct 8 issues from the ports or passages 9 and also passes into the branches 8$^a$ and issues from the ports or passages 9$^a$. By this means the drying agent may be introduced approximately evenly into the mass of blocks, between the lateral walls of said mass, and allowed to rise through said mass without lateral deflection by a cover or similar means placed upon the then uppermost group of green blocks.

I claim as my invention—

1. The herein-described method of treating plastic material, which method consists in forming said material, in the green state, into blocks; then setting said blocks in a plurality of superposed groups; driving a drying agent upward between the upright sides of the mass of blocks after the setting of each group, and deflecting said drying agent laterally through the last set group; and then subjecting the entire mass of said blocks to a high temperature, substantially as described.

2. The herein-described method of treating plastic material, which method consists in forming said material, in the green state, into blocks; then setting said blocks in a plurality of superposed groups within a compartment, said groups extending to or against the lateral walls of the compartment and having an upright flue-spacing beween said lateral walls, each successive group being subjected to the action of an artificially-moved drying agent before another group is set thereon, said drying agent being made to rise through said flue-spacing and move thence laterally through the then last of said groups and then upward out of said group; and then subjecting the entire mass of said blocks to a high temperature, substantially as described.

3. The herein-described method of treating plastic material, which method consists in forming said material, in the green state, into blocks; then setting said blocks in a plurality of superposed groups within a compartment, said groups extending to the lateral walls of the compartment and all excepting the uppermost group having an upright flue-spacing between said lateral walls; each successive group being subjected to the action of an artificially-moved drying agent before another group is set thereon, said drying agent being made to rise through said flue-spacing and move thence laterally through the then last of said groups, and then upward out of said group; and then subjecting the entire mass of said blocks to a high temperature, substantially as described.

4. The herein-described method of treating plastic material, which method consists in forming said material, in the green state, into blocks; then setting said blocks in a plurality of superposed groups within a compartment, said groups extending to the lateral walls of the compartment and having an upright flue-spacing between said lateral walls, each successive group being subjected to the action of an artificially-moved drying agent before another group is set thereon, said drying agent being made to rise through said flue-spacing and move thence laterally through the then last of said groups and then upward out of said group; and then passing a highly-heated gaseous medium into the base of said mass and thence through said mass, substantially as described.

5. The herein-described method of treating plastic material, which method consists in forming said material, in the green state, into blocks; then setting said blocks in a plurality of superposed groups within a compartment, said groups extending to the lateral walls of the compartment and having an upright flue-spacing between said lateral walls, each successive group being subjected to the action of an artificially-moved drying agent before another group is set thereon, said drying agent being made to rise through said flue-spacing and move thence laterally through the then last of said groups and then upward out of said group; and then passing a highly-heated gaseous medium into the base of said mass from opposite sides and thence through said mass, substantially as described.

6. The herein-described method of treating plastic material, which method consists in forming said material, in the green state, into blocks; then setting said blocks in a plurality of superposed groups within a compartment, said groups extending to the lateral walls of said compartment, a cover being placed upon each successive group, said cover extending almost to the lateral edges of said group and said group being then subjected to the action of an artificially-moved drying agent made to rise centrally through said group beneath said cover, and said cover being then removed before another group is set thereon; and then subjecting the entire mass of said blocks to a high temperature, substantially as described.

7. The herein-described method of treating plastic material, which method consists in forming said material, in the green state, into blocks; then setting said blocks in a plurality of superposed groups; driving a drying agent upward between the upright sides of the mass of blocks after the setting of each group, and deflecting said drying agent laterally through the last set group; then subjecting the entire mass of said blocks to a high temperature, and then passing air downward through said mass and thence through another group of green blocks, substantially as described.

8. The herein-described method of treating plastic material, which method consists in forming said material, in the green state, into blocks; then setting said blocks in a plurality of superposed groups within a compartment, said groups extending to or against the lateral walls of the compartment and having an upright flue-spacing between said lateral walls, each successive group being subjected to the action of an artificially-moved drying agent before another group is set thereon, said drying agent being made to rise through said flue-spacing and move thence laterally through the then last of said groups and then upward out of said group; then subjecting the entire mass of said blocks to a high temperature, and then passing air downward through said mass and thence through another group of green blocks, substantially as described.

9. The herein-described method of treating plastic material, which method consists in forming said material, in the green state, into blocks; then setting said blocks in a plurality of superposed groups within a compartment, said groups extending to the lateral walls of the compartment and all excepting the uppermost group having an upright flue-spacing between said lateral walls; each successive group being subjected to the action of an artificially-moved drying agent before another group is set thereon, said drying agent being made to rise through said flue-spacing and move thence laterally through the then last of said groups, and then upward out of said group; then subjecting the entire mass of said blocks to a high temperature; and then passing air downward through said mass and thence through another group of green blocks, substantially as described.

10. The herein-described method of treating plastic material, which method consists in forming said material, in the green state, into blocks; then setting said blocks in a plurality of superposed groups; and, after the setting of each group, driving a drying agent into the base of said mass of blocks between the upright sides of said mass and thence through said mass; and then subjecting the entire mass of said blocks to a high temperature, substantially as described.

11. The herein-described method of treating plastic material, which method consists in forming said material, in the green state, into blocks; then setting said blocks in a plurality of superposed groups; and, after setting each group, driving a drying agent into the base of said mass of blocks between the upright sides of said mass and thence through said mass; then subjecting the entire mass of said blocks to a high temperature; then passing a stream of air through said mass and thence through another group of green blocks, substantially as described.

12. The herein-described method of treating plastic material, which method consists in forming said material, in the green state, into blocks; then setting said blocks in a plurality of superposed groups; and, after the setting of each group, driving a drying agent upward through said mass; then subjecting the entire mass of said blocks to a high temperature; and then passing air downward through said mass, substantially as described.

13. The herein-described method of treating plastic material, which method consists in forming said materal, in the green state, into blocks; then setting said blocks in a plurality of superposed groups; and, after the setting of each group, driving a drying agent upward through said mass; then subjecting the entire mass of said blocks to a high temperature; then passing air downward through said mass and thence to and through another group of green blocks, substantially as described.

14. The herein-described method of treating plastic material, which method consists in forming said material, in the green state, into blocks; then setting said blocks in a plurality of superposed groups; driving air at moderate temperature upward between the upright sides of the mass of blocks after the setting of each group, and deflecting said air through the last-set group; and then subjecting the entire mass of said blocks to a high temperature, substantially as described.

15. The herein-described method of treating plastic material, which method consists in forming said material, in the green state, into blocks; then setting said blocks in a plurality of superposed groups; driving air at moderate temperature upward between the upright sides of the mass of blocks after the setting of each group, and deflecting said air through the last-set group; then subjecting the entire mass of said blocks to the action of a drying agent; and then subjecting the entire mass of said blocks to a high temperature, substantially as described.

In testimony whereof I have signed my name, in presence of two witnesses, this 10th day of November in the year 1905.

ALEXANDER ANDERSON SCOTT.

Witnesses:
　CYRUS KEHR,
　ROBT. L. FOUST.